INVENTOR
HAROLD KENNETH JOHNSTON, II
BY
ATTORNEY

United States Patent Office 3,649,358
Patented Mar. 14, 1972

3,649,358
METHOD FOR REDUCING THE VISCOSITY OF NON-NEWTONIAN LIQUIDS BY THE USE OF ULTRASONICS
Harold Kenneth Johnston II, Northglenn, Colo., assignor to International Business Machines Corporation, Armonk, N.Y.
Filed Dec. 23, 1968, Ser. No. 786,491
Int. Cl. H01f 41/14; B05b 17/06
U.S. Cl. 117—235            5 Claims

ABSTRACT OF THE DISCLOSURE

This invention is concerned with the controlled reduction in viscosity of a non-Newtonian liquid such as magnetizable inks by placing the liquid in a treatment chamber with one or more transducer elements coupled thereto for imparting ultrasonic vibrations to the liquid, and to a continous process for subjecting the liquid to ultrasonic vibrations as a preliminary to dispensing the liquid through a spray bar or applicator in coating operations and applying the non-Newtonian liquid at reduced viscosity to the surface to be coated, such as, the substrate of a magnetic tape.

---

Figure 1:
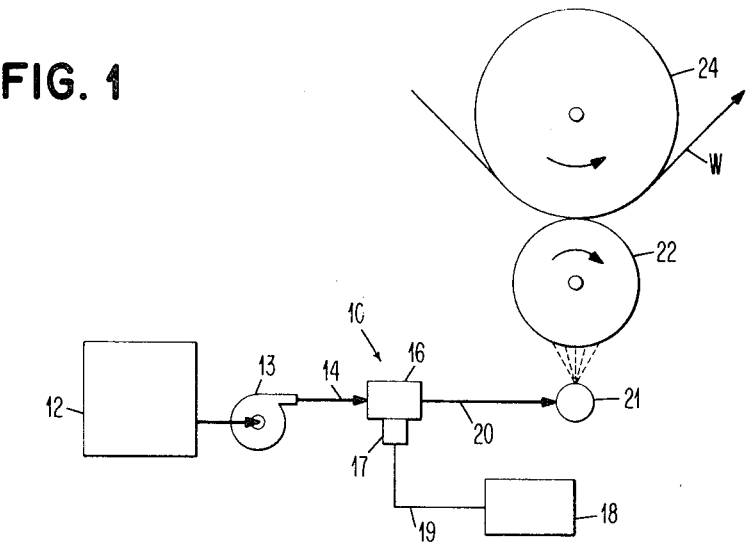

This invention relates to a novel and improved method and means for the treatment of liquids to effect a controlled reduction in viscosity and having specific reference to the reduction in viscosity of liquids as a preliminary to their application as coatings, such as, for instance, in the coating of magnetic tapes with a magnetizable ink material comprised in part of non-Newtonian liquids.

Non-Newtonian liquids may be characterized generally as having a viscosity which is not constant at a given temperature; stated another way, the liquids are distinguished from a Newtonian liquid, such as, water which will have the same viscosity as long as its temperature remains constant. Typical of the non-Newtonian liquids are the Bingham plastics, pseudo plastic liquids. dilitant liquids, thixotropic liquids and the rheopectic liquids. Vaseline and petroleum jelly are examples of the Bingham plastics and are characterized by having linear flow curves but with a yield point at which the material will not flow until a stress is applied that is greater than the yield point, since the material has a dimensional structure with sufficient rigidity to resist any stress up to the yield point.

Acrylonitrile-butadiene copolymers may be classed as pseudo plastic liquids having a decrease in apparent viscosity upon an increase in the rate of shear, but unlike Bingham plastics have no yield point. Dilitant liquids are opposite to the pseudo plastic liquids in that their apparent viscosity increases with an increase in shear rate. The thioxtropic and rheopetic liquids are minor types of non-Newtonian liquids, including hydrogen bonded compounds and the highly branched polymers, respectively.

In the application of the highly viscous non-Newtonian liquids to different uses, such as, surface coatings, it is often difficult to apply a layer at the desired thickness and uniformity. This is typified by the coating of magnetizable inks onto the surface of a web or matrix in the manufacture of magnetic recording media. Customarily, the ink is composed in part of a binder material or mixtures of binder materials, such as polyurethanes, polyvinyl chloride-polyvinyl acetate or butyl acrylate, all of which may be classed as non-Newtonian liquids.

In accordance with the present invention it has been determined that the viscosity of the liquids can be reduced, at a given temperature, by subjecting them to ultrasonic vibrations just prior to their application as a coating. As a result, the material can be more easily and uniformly spread at the desired consistency. While the reduction in viscosity is temporary in nature, the liquid will remain at the lower viscosity level for a sufficient length of time to permit its application or use but without altering its other properties or characteristics for the intended use. Thus the material can be spread in thin coatings and in many cases minimize the need for expensive mixing equipment, such as, kneaders, roll mills or ball mills or increase the time between the use of such equipment and actual coating of the liquid. While the use of ultrasonics in the mixing of materials is generally known, to the best of my knowledge and belief, ultrasonic vibrations have not been employed previously in effecting reduction in viscosity, particularly to effect the reduction in viscosity of liquids as a part of a continuous process and where a novel treatment chamber is employed to permit substantially continuous flow of the liquid as it is being treated.

It is therefore an object of the present invention to provide for a novel and improved method and apparatus for reducing the viscosity of liquids by the use of ultrasonic vibrations.

It is another object of the present invention to effect the controlled reduction in viscosity of non-Newtonian liquids by subjecting the liquids to ultra-sonic vibrations over a predetermined period of time as a preliminary to application or dispensing of the material as a surface coating and the like.

It is a further object of the present invention to provide a novel and improved process for coating surfaces with liquids in which the liquid is reduced in viscosity by subjecting it to ultrasonic vibrations and, in association therewith, to provide for novel apparatus for treatment of the liquid with ultrasonic vibrations as a part of a continuous process in a highly efficient and dependable controlled manner.

It is an additional object of the present invention to provide for a novel and improved process for manufacturing magnetic recording tape in which the viscosity of the magnetizable printing ink is reducted by ultrasonic vibrations as a preliminary to spraying or coating of the ink onto the matrix or web portion of the tape.

In accordance with the present invention, a preferred method involves the treatment of ink for magnetic tape in which the ink supply is directed through a treating chamber having one or more transducers energized by an ultrasonic generator to transmit sound waves into the liquid at the frequency of the generator. The optimum frequency range is from 450 to 1,000 k.c.p.s. and, depending upon the size of the chamber, may be applied over a predetermined time interval to effect a controlled reducuction in viscosity up to 50% of its original viscosity. From the treatment chamber, the ink material is applied under pressure through a spray bar onto a roll from whence the liquid is coated onto the matrix or web of the magnetic tape. In the preferred apparatus, a tubular chamber is provided with inlet and outlet ports adjacent to opposite ends of the chamber for flow of the liquid therethrough, and the transducer elements are positioned either at one or both ends to impart ultravonic vibrations to the liquids delivered into the chamber. Here the chamber either may form a part of the spray bar or other dispensing device or can be positioned in the flow line directly ahead of the spray bar.

The foregoing and other objects, features and advantages of the invention will be apparent from the following more particular description of preferred embodiments of the invention, as illustrated in the accompanying drawings.

FIG. 1 is an overall schematic view of a preferred method of coating a matrix or web with a liquid which has been subjected to ultrasonic vibrations.

Figure 2:
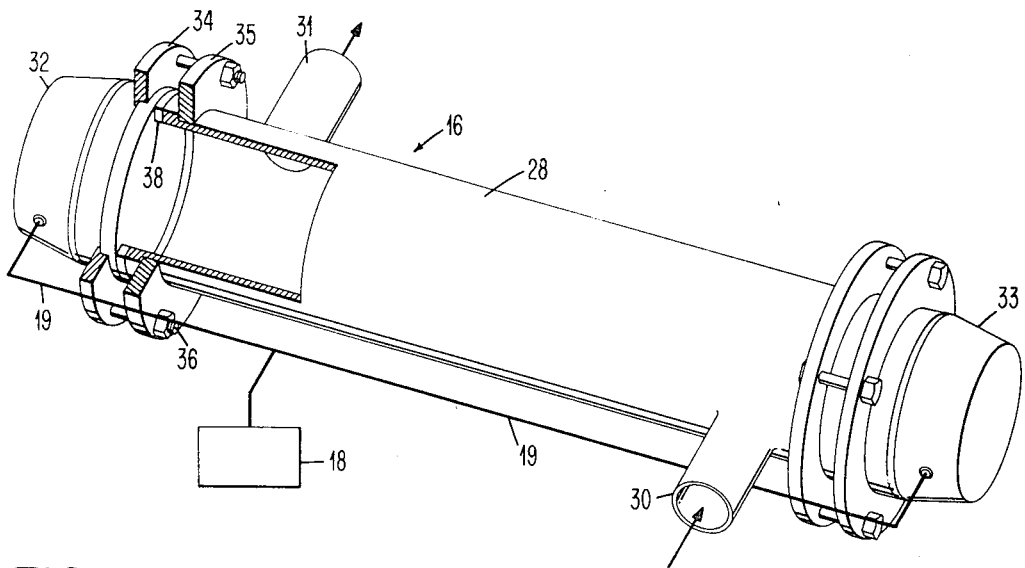
Figure 3:
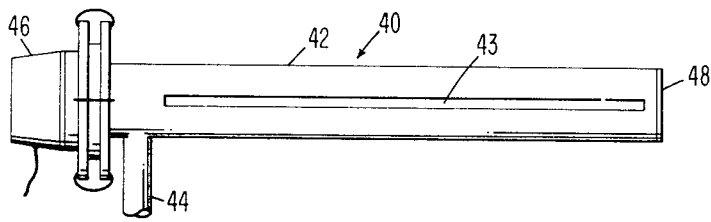

FIG. 2 is a preferred form of apparatus for ultrasonically treating the liquid to effect a controlled reduction in viscosity; and FIG. 3 is a modified form of apparatus in which the treatment chamber forms a part of the spray bar for effecting a controlled reduction in viscosity of the liquid. Referring in more detail to the drawings, there is shown by way of illustrative example in FIG. 1 an embodiment of the present invention in its application to the coating of a non-Newtonian liquid onto another surface, and specifically the step in the formation of magnetic recording tape wherein a magnetizable ink is coated on a matrix or web. As a setting for the present invention, the ink is characteristically composed of finely divided magnetizable particles, such as, iron oxide suspended in a lubricated binder system composed at least in part of a combination of dilitant and pseudo plastic liquid ingredients, such as, acrylonitrile butadiene resins and a vinyl chloride vinyl acetate copolymer.

As shown in FIG. 1, an apparatus 10 for coating the ink onto the substrate is shown wherein the liquid material is drawn from a supply tank or other source 12 by a pump 13 for delivery through a flow line represented at 14 to a viscosity-reducing treatment chamber 16. In a manner to be described, the liquid as it is advanced through the chamber 16 is subjected to ultrasonic vibrations by a transducer 17 which is energized by an ultrasonic generator 18 through a power input line 19. The ink is reduced in viscosity by irradiating over a predetermined time interval and advanced over line 20 to a spray bar 21, the latter being suitably provided with a longitudinal slit, not shown, for application of the liquid under pressure to the surface of a gravure roll 22. A pinch roll 24 cooperates with the gravure roll in advancing the web or substrate W of the tape between the rolls to receive a uniform coating of the ink material, and in a conventional manner the coated web is further treated and dried to form the finished product.

In the foregoing process and apparatus described, it is important to recognized that the final reduction in viscosity of the material is controlled largely by the power output of the ultrasonic generator as well as the frequency range of the ultrasonic vibrations applied by the transducer. Of course, the size of the chamber and the time interval over which the vibrations are applied are also factors to be considered together with the nature of the material. For a continuous process however the chamber is most advantageously proportioned in relation to the transducer in order to handle small volumes of material which are advanced at a constant rate of travel, or substantially so, and can be uniformly subjected to ultrasonic vibrations over a short time duration, usually a matter of seconds, to achieve maximum reduction as a preliminary to coating of the material onto the gravure roll. When the material is subjected to ultrasonic vibrations it will undergo an immediate reduction in viscosity and in a continuous process as described will not suffer any appreciable increase in viscosity if it is applied directly thereafter through the spray or coating bar. Generally however if the material is permitted to set over a matter of hours it will have a tendency to gradually increase in viscosity and return to its original viscosity level.

A preferred form of treatment chamber 16 is shown in FIG. 2 and which is adapted for irradiating non-Newtonian liquids in a substantially continuous, flow-through process. The treatment chamber 16 is defined by a thin-walled tube 28 having laterally extending inlet and outlet ports 30 and 31 projecting in diametrically opposed, lateral directions from adjacent the opposite ends of the tube 28. Transducer elements 32 and 33 are shown mounted at opposite ends of the tube and in each case the transducer is clamped in sealed relation to the end of the tube by an outer flange or shoulder 34 which is bolted to a stationary flange 35 by threaded bolt members 36, and an annular gasket or O-ring seal 38 is sandwiched between the inner end of the transducer and the edge of the tube at each end. The transducers may be selected from any of the commercially available transducer elements which are adaptable for use in the field of ultrasonics, such as, a piezoelectric or magnetostrictive transducer. Both types are solid state devices customarily used in ultrasonic welding or machine tool operations and require a high frequency electrical or magnetic field as an energy source. The ultrasonic generator represented at 18 for generating the field may take the form of a motor-generator, an electronic vacuum tube, or a transistor oscillator to supply power over common input line 19 to the transducer elements at the ends of the chamber.

In the modified form of apparatus shown in FIG. 3, again a treatment chamber 40 is in the form of a thin-walled tube 42 which serves also as a dispensing device for discharge of the materials by spraying under pressure through a spray bar slit 43 extending longitudinally of the side wall of the tube. An inlet port 44 delivers the material from the main flow line leading from the supply tank into one end of the tubular chamber and a transducer 46 is mounted at one end of the chamber adjacent to the inlet portion to subject the liquid material to ultrasonic vibrations as it enters the chamber. If desired, an air baffle represented at 48 may be positioned at the opposite end of the chamber to reflect the sound waves generated by the transducer 46 in order to accelerate the reduction in viscosity of the material and assure more uniform viscosity reduction throughout the material in the last amount of time. Accordingly, the modified form of apparatus is adaptable for use in place of a separate treatment chamber 16 and spray bar 20 as illustrated in FIG. 1 to effect reduction in viscosity of the liquid just prior to its ejection under pressure through the spray bar slit 43.

For the purpose of illustration and not limitation, the chamber 40 shown in FIG. 3 may be on the order of 1" in diameter and have an approximate length of 6", the diameter of the chamber preferably corresponding to that of the transducer in order to minimize reflection of the sound waves back against the transducer by the wall of the chamber. Considerations are somewhat different when opposing transducers are employed, as shown in FIG. 2, since the chamber is most desirably of sufficient length to prevent one transducer from taking up the output of the other and being damaged from the excessive heat generated. Moreover, in processes employing thermo-setting materials, the transducer should be capable of operating over 500 k.c.p.s. in order to prevent cavitation and possible curing or setting of the material which could or might otherwise occur below that frequency level. Otherwise, if the material is not a thermosetting resin, the frequency range of the transducer may range from 20 kc.p.s. up to 1 megacycle per second.

The following examples will serve to illustrate application and utilization of the apparatus described to the reduction in viscosity of different non-Newtonian liquids:

EXAMPLE 1

An acrylonitrile-butadiene resin combined with a vinyl chloride vinyl acetate polymer having an initial apparent viscosity of 6700 cps. was irradiated for fifteen seconds at 880 kc.p.s. Following irradiation its apparent viscosity was measured at 3,000 cps.; after setting ten minutes its apparent viscosity rose to 4,000 cps. and after twenty minutes rose to 4,400 cps.

EXAMPLE 2

An epoxy resin under the trademark Epon 826 and manufactured by the Shell Chemical Company falls under the general classification of a dilitant thixotropic material. A sample of the resin was determined to have an average initial apparent viscosity of 9,000 cps. and was irradiated at a frequency of 47 kc.p.s. for thirty minutes. After setting for one hour there was a decrease in average apparent viscosity to 4,000 cps. with a flow curve approximating that of a Newtonian liquid. It should be understood that irradiation for as much as thirty minutes is clearly in excess of the time needed to obtain substantial reduction of viscosity by this method.

EXAMPLE 3

An epoxy resin sold under the trademark Epon 828 had an average apparent viscosity of 12,000 cps. before being irradiated. After irradiation at a frequency of 47 kc.p.s. for fifteen minutes it had an apparent viscosity of 6,000 cps.

EXAMPLE 4

Ten grams of fumed silica and one hundred grams of methanol were mixed together and measured to have an apparent average viscosity of 5,000 cps. The liquid, a pseudo plastic thixotropic material was irradiated at a frequency of 880 kc.p.s. for thirty seconds and exhibited a substantial decrease in viscosity to 400 cps. After irradiation, its flow curve was similar to that of a Newtonian liquid.

In the foregoing examples, viscosities were taken with a Brookfield RVT viscometer at 25° C. and at different r.p.m.'s. A three-minute time period was allowed at each r.p.m. setting to compensate for any lag in the instrument and to let the material attain equilibrium prior to taking a reading. Two ultrasonic generators were alternately used in conducting the tests, one being operated at a frequency of 47 kc.p.s., and the other a broad band generator being operated at a frequency of 880 kc.p.s. Both systems incorporated quartz piezoelectric transducers.

During experimentation the spindle of the viscometer was inserted through the top of a treatment chamber having a single transducer mounted at the opposite end. The time interval of irradiation for each test was not found to have as much influence on the degree of reduction of viscosity as the power input, frequency range and chamber size.

In the last three examples, the time duration was substantially increased over that of the first example to evaluate the long-term effects of irradiation of material at different frequency levels, particularly on thermosetting materials which tend to be effected by cavitation when subjected to ultrasonic vibrations at frequencies below 450 kc.p.s. It was found generally that by maintaining the frequency level above 450 cps. cavitation in the materials was avoided and in general there was no detectable polymerization or degradation of materials placed in the ultrasonic field even for time periods up to forty-five minutes.

In the continuous flow-through process described with reference to FIG. 1, the time interval needed for reduction in viscosity to a desired level may be closely controlled by regulating the rate of flow through the chamber in relation to frequency level, power input and chamber size. When the preferred form of chamber 16, as shown in FIG. 2, is utilized, the flow line 14 is connected to the inlet port 30 and the flow line 20 connected to the outlet port, and the material is continuously advanced under pressure from the supply tank 12 through the chamber 16 and into the spray bar 21.

It will be appreciated that the viscosity can be reduced in successive stages by placing two or more treatment chambers in series either at the same or different frequency levels. In the specific examples given, where the materials were subjected to irradiation over a longer time interval, the material was merely left in the chamber over the selected time period, although the time intervals given are considerably longer than that necessary to achieve the desired viscosity.

It will be evident from the foregoing that utilization of ultrasonic energy as described represents a highly efficient and greatly simplified means of reducing viscosities of certain liquids and in many cases eliminates the necessity of introducing solvents or other additives to the liquid in order to reduce its viscosity. In practice, the present invention has been found to be particularly effective in the treatment of the dilitant and pseudo plastic materials, and has a secondary advantage in that the ultrasonic vibrations imparted will further homogenize and mix the liquid and other ingredients to some extent.

While the present invention has been described primarily in connection with a coating apparatus, its ready application and conformability for use in dispensing various liquid compounds will be readily apparent. Thus the material can be subjected to ultrasonic vibrations in a flow-through process as described, in an intermittent operation, or treated in large batches, for example, contained in a reservoir connected with the dispensing device.

While the invention has been particularly shown and described with reference to preferred embodiments thereof, it will be understood by those skilled in the art that various changes in form and details may be made therein without departing from the spirit of the invention.

What is claimed is:

1. The method of coating a substrate with a magnetizable ink in the formation of a magnetic recording medium in which the ink includes a binder material composed at least in part of a non-Newtonian liquid comprising the steps of advancing the magnetizable ink under pressure through a treatment chamber, generating ultrasonic vibrations outside the path of flow of the magnetizable ink through the chamber and transmitting the vibrations through the chamber as the magnetizable ink is advanced therethrough, subjecting the magnetizable ink in the treatment chamber to ultrasonic vibrations over a time interval sufficient to effect a controlled reduction in apparent viscosity, substantially continuously discharging the magnetizable ink at the reduced viscosity onto a surface for application to the substrate, and immediately applying the magnetizable ink substantially at the reduced viscosity level to the substrate.

2. The method according to claim 1 in which the magnetizable ink is advanced at a uniform rate through the treatment chamber.

3. The method of coating according to claim 1 in which ultrasonic vibrations are applied to the magnetizable ink in the range of 20 to 1000 kilocycles per second.

4. The method of coating according to claim 1 in which the ultrasonic vibration generating means are disposed at opposite ends of the treatment chamber and the Non-Newtonian liquid is advanced in an axial direction through the chamber.

5. The method of coating according to claim 4 further characterized by discharging the magnetizable ink laterally through an aperture provided in the treatment chamber for continuous application to the substrate to be coated.

References Cited

UNITED STATES PATENTS

| | | | |
|---|---|---|---|
| 2,584,053 | 1/1952 | Seavey et al. | 259—4 |
| 2,620,894 | 12/1952 | Petersen et al. | 259—1 X |
| 2,637,535 | 5/1953 | Miller | 259—1 |
| 2,763,204 | 9/1956 | Sims | 117—235 X |
| 2,773,507 | 12/1956 | Norris | 137—92 |
| 3,021,119 | 2/1962 | Van der Burgt | 259—72 |
| 3,049,077 | 8/1962 | Damm | 117—235 X |
| 3,054,751 | 9/1962 | Biake | 117—235 X |
| 3,078,179 | 2/1963 | Kuhn et al. | 117—111 X |

(Other references on following page)

UNITED STATES PATENTS

| | | | |
|---|---|---|---|
| 3,099,993 | 8/1963 | Smith | 137—13 |
| 3,143,124 | 8/1964 | Todd | 137—13 |
| 2,987,416 | 6/1961 | Wessel | 117—64 |
| 2,637,535 | 5/1953 | Arnold | 259—1 |
| 2,666,719 | 1/1954 | Lissant | 117—132 |
| 2,887,458 | 5/1959 | Fitzgerald | 260—18 |
| 3,023,123 | 2/1962 | Colwill et al. | 117—44 |
| 3,055,777 | 9/1962 | Grad | 117—212 |
| 3,165,299 | 1/1965 | Balamuth et al. | 259—1 |
| 3,243,867 | 4/1966 | Bernstein | 29—155.5 |
| 3,233,872 | 2/1966 | Bouyoucos | 259—1 X |
| 3,243,122 | 3/1966 | Snaper | 239—4 X |
| 3,285,579 | 11/1966 | Guerin | 259—1 X |
| 3,334,351 | 8/1967 | Stauffer | 239—4 X |
| 3,379,593 | 4/1968 | Maze et al. | 117—111 X |

WILLIAM D. MARTIN, Primary Examiner

B. D. PIANALTO, Assistant Examiner

U.S. Cl. X.R.

117—105.4, 111; 118—259, 612; 239—4; 259—9

UNITED STATES PATENT OFFICE
CERTIFICATE OF CORRECTION

Patent No. 3,649,358            Dated March 14, 1972

Inventor(s) H. K. Johnston II

It is certified that error appears in the above-identified patent and that said Letters Patent are hereby corrected as shown below:

Column 6, lines 55-56, "Non-Newtonian liquid" should read --magnetizable ink--.

Signed and sealed this 26th day of September 1972.

(SEAL)
Attest:

EDWARD M. FLETCHER, JR.
Attesting Officer

ROBERT GOTTSCHALK
Commissioner of Patents